Dec. 30, 1930.  E. W. N. BOOSEY  1,786,597
DRAINAGE FITTING
Filed Aug. 22, 1929
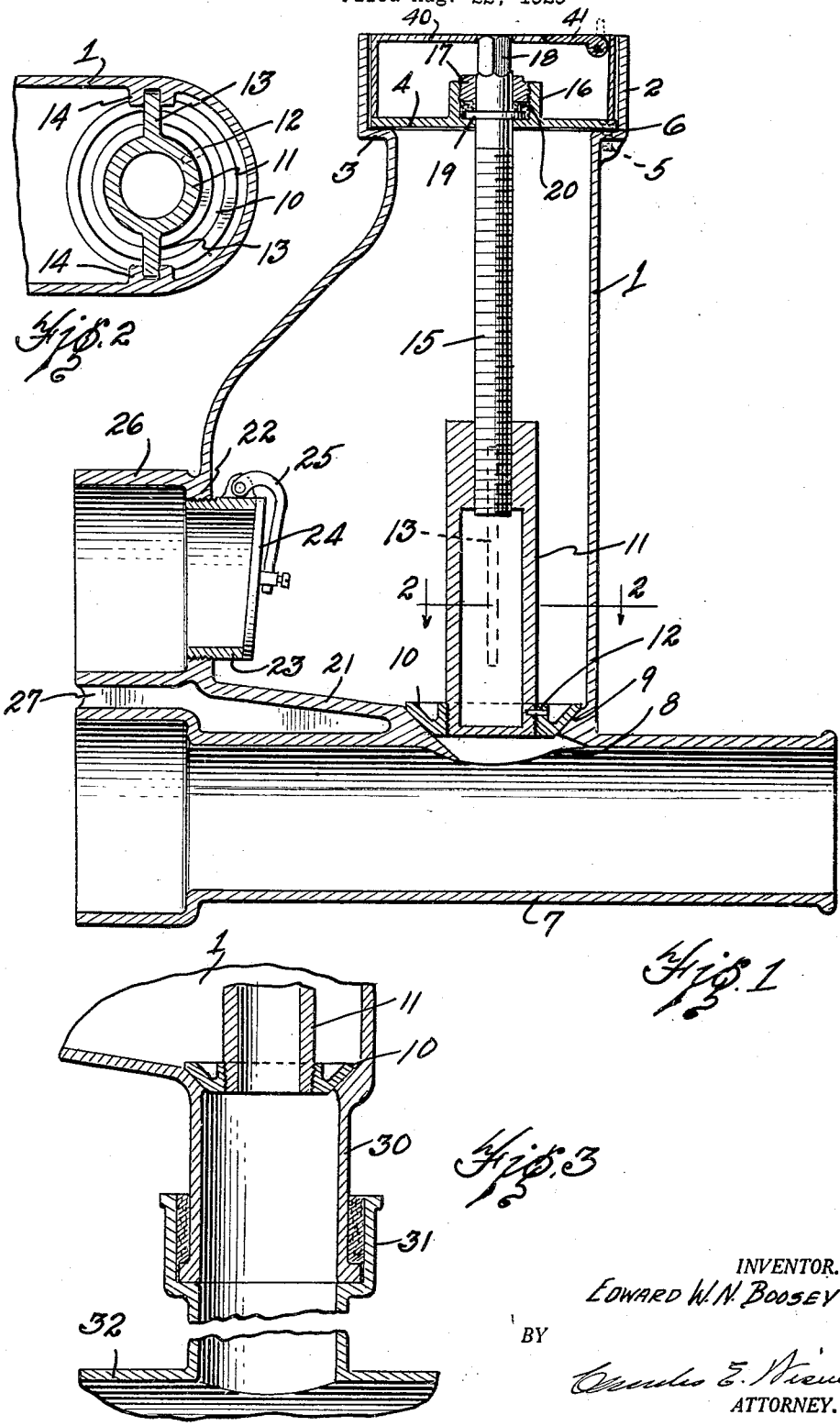
INVENTOR.
EDWARD W. N. BOOSEY
BY
ATTORNEY.

Patented Dec. 30, 1930

1,786,597

UNITED STATES PATENT OFFICE

EDWARD W. N. BOOSEY, OF DETROIT, MICHIGAN

DRAINAGE FITTING

Application filed August 22, 1929. Serial No. 387,572.

This invention relates to drainage fittings, its purpose being to provide a fitting for installation in a sewage or waste conduit to which fitting a drain line may be connected, the fitting being arranged to prevent back flow in the drain line and to provide means to shut off the conduit from the drain line without interfering with flow through the conduit.

A further purpose is to provide a fitting that is attachable to a conduit and embodying the features above mentioned.

In previous constructions of this character a drainage line from a building for instance is usually connected directly with the sewer or waste conduit and in some cases a back water floor drain is utilized between the drain and the conduit to which the respective drain and conduit directly lead. Such arrangement is more or less serviceable where only a single drain is to be connected to the conduit and provides the sole inlet to the conduit. There are many installations which require several drains to be connected with the same conduit for which purpose previous fittings are not well adapted.

The principal feature of this present invention is in the provision of a fitting which may be connected in the sewage conduit at any point of its length and the fitting may be made integral with a portion or section of the sewage conduit or attachable thereto either form being for the same purpose and functioning in the same manner.

These and other objects and the several novel features of the invention are hereinafter more fully described and claimed, and the preferred form of construction of a drainage fitting embodying my invention is shown in the accompanying drawings in which—

Fig. 1 is a vertical section of my improved fitting showing a portion of a sewage conduit formed integrally therewith.

Fig. 2 is a section taken on line 2—2 of Fig. 1.

Fig. 3 is a detail showing an alternative form of construction.

The fitting consists of a hollow casing 1 preferably formed with a hub 2 at the top providing a shoulder 3 for a closure plate 4. This plate may be secured to the said shoulders by screws one of which is indicated in dotted lines at 5 and a packing ring 6 is provided between the plate and the shoulder. This plate may be of any desired form and provides in conjunction with the hub a valve operating case as is hereinafter more fully described. The casing at its lower end is formed integrally with a section 7 of a sewage conduit as shown in Fig. 1 and an aperture 8 is provided between the chamber of the casing 1 and the conduit 7 which is formed with a seat for the valve 10. The valve may be of any desired form and as here shown is provided with a tapered face to fit the tapered seat 9 and is threaded onto the lower end of a hollow stem 11 and pinned or screwed in place as by means of a pin 12.

The stem 11 of the valve, as is shown in Fig. 2, is provided with horizontal wings 13 on diametrically opposite sides of the interior of the valve casing 1 above the outlet 8. These wings 13 and ways 14 provide a guide for movement of the valve vertically in the casing. The hollow stem 11 has a threaded aperture at its upper end to receive the operating stem 15 which is in threaded relation therewith and extends through an aperture in the plate 4 about which is provided a hub 16 internally threaded to receive a packing nut 17. The upper end 18 of the stem is squared or formed to provide a connection for an operating handle and the stem 15 is provided with a collar 19 riding on the upper surface of the plate. A packing 20 is inserted between the collar and the nut and thus the stem 15 is held from longitudinal movement and rotation of the stem 15 in one direction or the other raises or lowers the valve due to the threaded relation of the stem 15 and the hollow stem 11.

The preferred operating handle is indicated at 40 in Fig. 1 and consists of an inverted cup-shaped member, the lower open end of which rests on the plate 4 and the upper surface of which is practically flush with the hub end and floor line and thus provides a cover for the upper end of the structure. The upper surface of this member has incorporated therewith a pivoted handle portion 41 which may be turned upward to a vertical position and provides a means by which the member 40 may be rotated. This will rotate the stem 15 by reason of the squared end 18 of the stem extending into a square aperture provided therefor in the member 40 as indicated.

The bottom of the casing at 21 slopes upwardly slightly from the valve seat 9 to the side of the case which is apertured and threaded as at 22 to receive a tubular member 23 insertible thereinto from the interior of the casing 1. On this tubular member is mounted a swing check valve 24 carried by the pivoted arm 25 and the end of the tubular member is preferably finished to a slight angle to provide a seat for the valve 24 which closes by gravity or from pressure within the chamber.

The casing at the aperture is provided with an external hub 26 of a character to receive a drain conduit (not here shown) and through which the drain line from a room or a building may be connected. Preferably this inclined wall 21 and the hub 26 are supported by a web 27 cast integral with the conduit 7 and the casing.

The fitting described is adapted to be introduced at any point in a sewage conduit as the member 7 is of the same length and form of construction more particularly at its ends in accordance with the section of the sewage conduit with which it is to be used (which is usually an iron conduit) permitting this section 7 and connected fitting to be introduced in place of any section of a sewage conduit. Thus, where there is a single sewage conduit for a block of stores for instance or a series of rooms each of which require separate connection with the sewage conduit, a fitting of this character may be introduced therein in convenient relation to each store or room and the drain line from the store or room introduced into the hub 26, the hub 2 of the casing coming practically to the floor line where it is convenient for operation in case of back pressure occurring in the conduit 7 and chamber within the casing 1.

Normally the valve 9 is open and material entering the casing through the hub 26 and tubular member 23 causes the valve 24 to open and material pass through the casing 1 into the conduit 7. In the case of back pressure arising in the conduit 7 and chamber 1 the swing check valve 23 would close automatically.

In such case the valve 10 would be manually closed through operation of the stem as heretofore stated leaving the conduit 7 clear for flow of sewage therethrough from other sources or fittings of this character and permitting an examination to be made of this chamber 1 and the drainage conduit leading to the hub 26 to free the same of obstruction or to permit repair as the case may require.

There are many installations in which the sewage conduit 7 is at a considerable distance below the floor surface. In such case the lower end of the casing 1 is formed with a tubular extension 30 adapted to be caulked into a hub such as is indicated at 31 or of a vertical conduit leading downward to the sewer conduit indicated at 32. For this purpose the sewage conduit may be provided with a short hub and several lengths of pipe introduced between the member 30 and the conduit 32 as will be readily understood. This will depend entirely upon the depth at which the sewage conduit is positioned beneath the floor or surface to be drained. The same valve arrangement is indicated in this alternative form of Fig. 3 and the construction and arrangement of the casing 1 in all general respects is the same as the construction shown in Fig. 1.

It is also to be understood that the fitting as constructed according to Fig. 1 may be placed with the upper end 2 any necessary distance below the floor or ground surface by caulking piping in the hub 2 to extend upwardly to the floor surface. In such case the stem 15 is made of corresponding length and the plate 4 and operating handle 40 are placed in the uppermost hub of the piping in the same manner as here shown.

From the foregoing description it is evident that the device is simple and comparatively inexpensive in construction; that it may be formed integrally with a conduit or attachable thereto, and that the various objects of the invention are secured by the construction described.

Having thus briefly described my invention, what I claim and desire to secure by Letters Patent of the United States is—

1. A drainage fitting comprising a chambered casing having an inlet on one side, a swing check valve adapted to prevent back flow from the casing through the opening, a conduit formed integrally with the bottom of the casing, there being an opening in the bottom of the casing providing for a discharge therefrom to the conduit, and a valve for controlling the opening.

2. A drainage fitting comprising a chambered casing having an inlet on one side, a swing check valve preventing back flow from the casing through the opening, a conduit connected with the bottom end of the casing, there being an outlet opening in the bottom of the casing providing for discharge to the conduit, and a valve for controlling the said opening.

3. A drainage fitting comprising a chambered casing having an inlet on one side near the bottom, an external hub formed integral with the casing about the said opening adapted to receive a drainage connection, a swing check valve preventing back flow through the opening, a conduit connected with the bottom of the casing, there being an opening in the bottom of the casing providing for flow to the conduit, said casing having an inclined bottom extending downwardly from said inlet to the outlet, the upper end of the casing having an opening providing access to the interior, and detachable means for sealing said opening.

4. A drainage fitting comprising a chambered casing having an inlet on one side, an external hub formed about the inlet to receive a drain connection, a swing check valve within the casing preventing back flow from the casing through the inlet opening, a conduit connected with the bottom of the casing, an opening in the bottom of the casing permitting discharge to the conduit, a valve controlling the said opening, a valve operating means extending upwardly to the top of the casing, the top of the casing having an open end, a plate in sealable relation with the said opening and through which the valve operating means extends, and means for preventing leakage about the plate and casing and valve operating means.

5. A drainage fitting comprising a chambered casing having inlet on one side near the bottom, an external hub formed integral with the casing about the opening adapted to receive a drainage connection, a tubular member adapted to be secured in the said opening and extending into the casing, a swing check valve on the casing end of the tubular member, a conduit section attached to the bottom of the casing adapted to form part of a sewage conduit, there being an opening from the casing to the conduit section, the bottom wall of the casing being downwardly inclined from the said inlet to the outlet opening, the said casing having an open upper end formed with a hub to receive piping.

6. A drainage fitting comprising a chambered casing having inlet on one side near the bottom, an external hub formed integral with the casing about the opening adapted to receive a drainage connection, a tubular member adapted to be secured in the said opening and extending into the casing, a swing check valve on the casing end of the tubular member, a conduit section attached to the bottom of the casing, there being an opening from the casing to the conduit section, the bottom wall of the casing being downwardly inclined from the said inlet to the outlet opening, the said casing having an open upper end formed with a hub to receive piping and said conduit attached to the bottom being formed with a hub at one end to receive an end of a section of sewage conduit and being formed at the opposite end for insertion in a section of sewage conduit.

7. A drainage fitting comprising a chambered casing, having an opening at its upper end providing access to the interior thereof, a detachable member for closing the opening and preventing flow of fluid upward therethrough, said casing having an opening on one side near the bottom adapted for connection of a drain line, a swing check valve controlling the said opening preventing back flow from the casing through the said inlet, a conduit section connected with the bottom of the casing, the bottom wall having an opening through which fluid may flow to the conduit, a vertically movable valve in the casing controlling the said opening, a stem for operating the valve extending through the upper end of the casing and detachable member therein, and means for guiding the valve in its movement.

In testimony whereof I have signed this specification.

EDWARD W. N. BOOSEY.